United States Patent Office 3,272,824
Patented Sept. 13, 1966

3,272,824
4-AMINO-6,7-DI(LOWER)ALKOXYQUINOLINES
Frank Frederick Ebetino and George Carlin Wright, Norwich, N.Y., assignors to The Norwich Pharmacal Company, a corporation of New York
No Drawing. Filed Dec. 6, 1962, Ser. No. 242,646
6 Claims. (Cl. 260—288)

This invention relates to novel chemical compounds and their preparation. More particularly, this invention is concerned with 4-amino-6,7-di(lower) alkoxyquinolines, their N-amino derivatives and methods for the preparation thereof.

The novel 4-amino-6,7-di(lower) alkoxyquinolines of this invention may be represented by the formula:

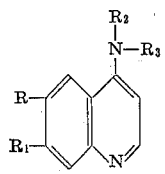

R and $R_1$ each represent a member of the group consisting of methoxy and ethoxy;
$R_2$ represents a member of the group consisting of hydrogen and methyl;
$R_3$ represents a member of the group consisting of hydrogen, amino, lower alkyl, hydroxy(lower)alkyl, lower alkoxy lower alkyl, carbethoxymethyl, amino(lower) alkyl, di(lower)alkylamino(lower)alkyl, acetyl, benzyl, phenyl and cyclohexyl; and $R_2$ and $R_3$ taken together represent the atoms necessary to complete a ring system chosen from the group consisting of morpholinyl and N-methylpiperazinyl.

Also comprehended within this invention are the physiologically acceptable acid addition salts of the compounds represented by the formula given above.

These new compounds possess valuable pharmacological activities, particularly as hypotensive agents. When administered intravenously to anesthetized normotensive dogs in doses in the range of from 1 to 20 mg./kg., a rapid and marked fall in diastolic and systolic blood pressure ensues which persists for from one to eight hours depending on the dose. When administered perorally to unanesthetized hypertensive dogs in similar doses, these compounds produce a lowering of systolic blood pressure which is slow in onset and which is maintained for as long as eight hours. Other pharmacological effects possessed by these compounds are evidenced in their action on vascular smooth muscle and in their ability to act as adrenergic blocking agents. The pharmacological effects evinced by these compounds are unaccompanied by adverse toxic manifestations at effective doses.

The compounds of this invention are formed by a reaction which is most simply illustrated by the following equation:

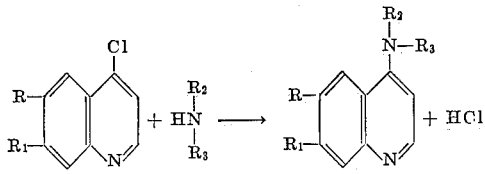

wherein R, $R_1$, $R_2$ and $R_3$ have the significance ascribed hereinabove. In carrying out the reaction the reactants are brought together, preferably in the presence of a solvent and under the influence of heat for a time period sufficient to permit their interaction. Typical solvents useful in the reaction are phenol, dimethylformamide, water, and ethanol. Solvents such as phenol and dimethylformamide permit the conductance of the reaction in conventional apparatus; while a solvent such as ethanol dictates the use of apparatus capable of withstanding with safety pressures generated during the course of the reaction. Exemplary of such apparatus for use with relatively low boiling solvents is the high pressure bomb.

The desired product is secured from the reaction in accordance with practices familiar in the art: (a) the reaction mixture is basified, cooled and extracted with a suitable solvent such as chloroform, diethyl ether, and the like whereafter the solvent is removed to yield the base or first treated with a mineral acid to produce a salt which precipitates therefrom, followed by filtration and recrystallizing, if desired, the resultant product from solvents such as acetonitrile, lower alkanols and aqueous mixtures thereof, using a clarifying agent such as charcoal, if desired; or (b) the reaction mixture is cooled and the salt filtered directly therefrom or it may be poured into an inert solvent such as diethyl ether whereby the desired product is precipitated and recovered by filtration, followed by purification as outlined in (a), if desired. Whether the base or a salt thereof be secured from the reaction mixture, one is readily converted to the other by means well known in the art; viz., the base, dissolved in a solvent such as chloroform or ethanol, is treated with an acid, for instance, HCl gas, to form the salt; or the salt dissolved in water is treated with a base, for instance, ammonium hydroxide to produce the base.

For convenient administration to elicit the pharmacological effects of these compounds they are readily adapted to conventional pharmaceutical formulation in the form of tablets, capsules, suspensions, solutions and the like using carriers and excipients well known in the art. Tablets may be prepared using excipients such as sodium citrate, calcium carbonate and dicalcium phosphate in conjunction with starch, alginic acid, and various binders such as sucrose, gelatin and acacia. Gelatin is a readily available encapsulation material. Aqueous suspensions are readily prepared using emulsifying and suspending agents such as sodium carboxymethylcellulose, polyvinylpyrrolidone and tragacanth gum. Solutions may be prepared using water and non-toxic organic solvents such as propylene glycol, sorbitol and glycerine.

The following examples illustrate the methods used in the preparation of the new compounds.

EXAMPLE I

*4-hydrazino-6,7-dimethoxyquinoline dihydrochloride*

A suspension of 5 g. (0.224 mole) of 4-chloro-6,7-dimethoxyquinoline in 20 ml. of 100% hydrazine hydrate is heated at reflux temperature for 75 minutes. The solution is cooled and the precipitate filtered and rinsed with water. The crude solid is recrystallized twice from 5% hydrochloric acid (20–25 ml.) to yield 1.4 g. (21%), M.P. 283–288° C.

*Anal.*—Calc. for $C_{11}H_{13}N_3O_2 \cdot 2HCl$: C, 45.22; H, 5.17; N, 24.30. Found: C, 45.56; H, 5.18; N, 24.67.

EXAMPLE II

*4-amino-6,7-dimethoxyquinoline hydrochloride*

A. A solution of 4-chloro-6,7-dimethoxyquinoline, 46 g. (0.21 mole), in 173 ml. of phenol is heated at 75–80° C., while anhydrous ammonia is bubbled through the solution for ½ hour. The addition of ammonia is continued while the temperature of the reaction mixture is gradually raised to refluxing conditions, and the temperature is maintained at 185–192° C. for 2 hours. After being subjected to steam distillation for 3 hours, the hot solution (ca. 1 l.) is treated with charcoal for 10 minutes and filtered. The filtrate is concentrated to a volume of 250 ml., and treated with 40 ml. of 10% NaOH to a pH of 9–10, while cooling in an ice bath. Through the addition of excess NaCl, the material is induced to crystallize. The crude material is collected and washed with 30, 20 and 10 ml. portions of water. After drying in air overnight, the crude material is extracted with 200 ml. of hot ethanol. The extract is treated with charcoal and then treated with dry HCl, while cooling in an ice bath. The resultant cream-colored solid is collected, and washed with alcohol and ether to give 4-amino-6,7-dimethoxyquinoline hydrochloride having a M.P. of 267–269° C. (Yield: 14.6 g.) It may be recrystallized from a mixture of 80 ml. of ethanol and 70 ml. of water, heating 3 minutes with charcoal, to yield the product having a M.P. of 274–276° C.

B. 11 g. (.05 mole) of 4-chloro-6,7-dimethoxyquinoline in 110 ml. of saturated alcoholic ammonia is heated at 165–175° C. for four hours in a high pressure bomb (rocking type) and allowed to cool to room temperature. The tan solid is separated by filtration. Recrystallization from 100 ml. of 70% isopropyl alcohol yields 5.5 g. (42% of theory) of 4-amino-6,7-dimethoxyquinoline hydrochloride in the form of its monohydrate having a melting point of 268–269° C.

*Anal.*—Calc. for $C_{11}H_{12}N_2O_2 \cdot HCl \cdot H_2O$: C, 51.07; H, 5.84; N, 10.83; Cl, 13.71. Found: C, 51.33; H, 5.68; N, 10.70; Cl, 14.10.

EXAMPLE III

6,7-dimethoxy-4-methylaminoquinoline hydrochloride

Through a solution of 50 g. (0.22 mole) of 4-chloro-6,7-dimethoxyquinoline, in 250 ml. of phenol, is passed dry monomethylamine for 2 hrs., heating at 75–85° C. The reaction solution is then heated to 180° C. in 1 hr., and then refluxed for 2½ hrs. at 170–176° C. with continuous passage of the amine.

The resultant solution is dissolved in 600 ml. of chloroform, cooled in an ice bath, and treated with 1080 ml. of 10% NaOH. The layers are separated, and the aqueous layer is further extracted with a total of 5 l. of chloroform. The chloroform extract is dried over $MgSO_4$ overnight and treated with charcoal and then the chloroform solution is distilled to dryness. The semi-crystalline residue is triturated with 200 ml. of ether, and the resultant light tan solid is collected, washing well with ether. The crude product, 19.4 g., is dissolved in 250 ml. of chloroform, and treated with dry HCl, cooling in an ice bath. The resultant cream-colored solid is collected, washing well with chloroform. It is recrystallized from 110 ml. of ethanol, heating 5 min. with charcoal, and the product is washed with twice 10 ml. of ethanol, 10 ml. of isopropanol, and ether to give 6,7-dimethoxy-4-methylaminoquinoline hydrochloride having a M.P. of 268–270° C. (dec.). (Yield: 16.2 g. (29%).)

*Anal.*—Calc. for $C_{12}H_{14}N_2O_2 \cdot HCl$: C, 56.58; H, 5.94; N, 11.00. Found: C, 56.16; H, 5.61; N, 10.96.

EXAMPLE IV

6,7-dimethoxy-4-(2-ethoxyethylamino)quinoline

In a 500 ml. 3-neck flask, equipped with condenser, stirrer and thermometer, is placed 22 g. (0.1 mole) of 4-chloro-6,7-dimethoxyquinoline, 18 g. (0.2 mole) of ethoxyethylamine and 80 ml. of molten phenol. The mixture is heated to reflux and refluxing is continued for three hours. The reaction mixture is allowed to cool to room temperature and then is poured, with good stirring, into two liters of ether. The tan precipitate which forms is filtered and washed with ether. The solid is recrystallized from acetonitrile, yielding 31 g. of material. The hydrochloride is converted to the 6,7-dimethoxy-4-(2-ethoxyethylamino)quinoline by dissolving in water and adding ammonium hydroxide. The solid that slowly precipitates weighs 22 g. (81% yield), M.P. 187–191° C.

In another similar preparation, the reaction mixture is treated with 2% NaOH and the free base is obtained by extraction with chloroform followed by evaporation of chloroform and recrystallization from isopropyl alcohol yielding 14 g. of 6,7-dimethoxy-4-(2-ethoxyethylamino)quinoline (50% yield). It may be recrystallized from isopropanol to give a M.P. of 190–193° C.

*Anal.*—Calc. for $C_{15}H_{20}N_2O_3$: C, 65.19; H, 7.30; N, 10.14. Found: C, 65.10; H, 7.31; N, 10.31.

EXAMPLE V

6,7-dimethoxy-4-(2-hydroxyethylamino)quinoline hydrochloride

In a 500 ml. 3-neck flask is placed 22 g. (0.1 mole) of 4-chloro-6,7-dimethoxyquinoline, 80 ml. of molten phenol and 6.1 g. (0.1 mole) of ethanolamine. After equipping the flask with stirrer, reflux condenser and thermometer, the reaction mixture is heated rapidly to 170–180° C. The reaction mixture is maintained at this temperature for 1⅔ hours. It is then allowed to cool to room temperature and poured into 1.5 liters of anhydrous ether. The ethereal solution is separated by decantation from the precipitate that forms. The precipitate is triturated with an additional 500 ml. of ether. Filtration and washing with ether give 33 g. of solid. Recrystallization of 28 g. of this solid from 700 ml. of methanol gives a first crop of 10 g., M.P. 236–237.5° C. and a second crop of 4.5 g., M.P. 233.5–236° C. The total amount recovered of 6,7-dimethoxy-4-(2-hydroxyethylamino)quinoline hydrochloride in the form of its monohydrate is 14.5 g. (48% yield).

*Anal.*—Calc. for $C_{13}H_{16}N_2O_3 \cdot HCl \cdot H_2O$: C, 51.57; H, 6.33; N, 9.25; Cl, 11.17. Found: C, 51.54; H, 6.14; N, 9.20; Cl, 12.18.

EXAMPLE VI

4-benzylamino-6,7-dimethoxyquinoline hydrochloride

In a 500 ml. 3-neck flask, equipped with reflux condenser, stirrer and thermometer, is placed 44 g. (0.2 mole) of 4-chloro-6,7-dimethoxyquinoline, 22 g. (0.2 mole) of benzylamine and 160 ml. of molten phenol. The reaction mixture is heated to reflux and the reflux temperature is maintained for two hours. The reaction mixture is allowed to cool to room temperature and is poured into about 2 liters of anhydrous ether. Filtration and washing with ether give a crude material which is immediately recrystallized from 1 liter of methanol. This procedure yields 34 g. (69%) of 4-benzylamino-6,7-dimethoxyquinoline hydrochloride, M.P. 248–249° C.

*Anal.*—Calc. for $C_{18}H_{18}N_2O_2 \cdot HCl$: C, 65.35; H, 5.79; N, 8.47. Found: C, 65.14; H, 5.75; N, 8.47.

EXAMPLE VII

6,7-dimethoxy-4-(4-methylpiperazino)quinoline dihydrochloride

In a 500 ml. 3-neck flask is placed 22 g. (0.1 mole) of 4-chloro-6,7-dimethoxyquinoline, 80 ml. of molten phenol and 10 g. (0.1 mole) of N-methylpiperazine. The solution is heated to reflux and held at this temperature for two hours. After allowing the mixture to cool to room temperature, the contents of the reaction flask are poured into two liters of ether. The precipitate is filtered and washed with ether yielding 25 g. of crude product. It may be recrystallized from methanol to give the 6,7-dimethoxy-4-(4 - methylpiperazino)quinoline dihydrochloride in the form of its monohydrate, M.P. 240–246° C. (dec.).

*Anal.*—Calc. for $C_{16}H_{21}N_3O_2 \cdot 2HCl \cdot H_2O$: C, 50.80; H, 6.66; N, 11.11; Cl, 18.79. Found: C, 50.93; H, 6.69; N, 10.65; Cl, 18.90.

EXAMPLE VIII

6,7-dimethoxy-4-dimethylaminoquinoline hydrochloride

Through a solution of 70 g. (0.31 mole) of 4-chloro-6,7-dimethoxyquinoline, in 450 ml. of distilled dimethylformamide, is passed dry dimethylamine at 40–85° C. in 35 min., until the solution is saturated. The passage of amine is discontinued, and the solution is heated to 140° C. in 40 min. Again the amine is passed through the solution at 145–150° C. for 6½ hrs. The solution is allowed to stand overnight.

The reaction solution is added to 2300 ml. of dry ether. The resultant light brown solid (dimethylamine hydrochloride) is filtered, and the filtrate is stripped to dryness, under the water pump, while heating on the steam bath. In order to purge the residual dimethylformamide, the crude material is dissolved in 150 ml. of isopropanol and again stripped to dryness. The residue is dissolved in 500 ml. of isopropanol, and treated gradually with 110 ml. of 10% HCl while cooling in an ice bath. A cream-colored solid deposits and is filtered, washing with a total of 120 ml. of isopropanol and with ether. The crude product (68 g.) is recrystallized from 700 ml. of ethanol, heating 6 min. with charcoal, to give the 6,7-dimethoxy-4-dimethylaminoquinoline hydrochloride in the form of its hemihydrate, M.P. 244–245° C. (Yield: 47 g. (54%)).

*Anal.*—Calc. for $C_{13}H_{16}N_2O_2 \cdot HCl \cdot \frac{1}{2}H_2O$: C, 56.21; H, 6.52; N, 10.90. Found: C, 56.01; H, 6.35; N, 9.91.

EXAMPLE IX

*4-isopropylamino-6,7-dimethoxyquinoline hydrochloride*

To a solution of 100 g. (0.45 mole) of 4-chloro-6,7-dimethoxyquinoline in 600 ml. of phenol is added 40 ml. (0.47 mole) of isopropylamine. The solution is gradually heated to 182° C. in 40 min. and refluxed for ½ hr. at 160–180° C. Then an additional 15 ml. (0.18 mole) of isopropylamine is added through the condenser, and the solution is refluxed at 160–177° C. for 2 hrs. Cooled to room temperature, the reaction solution is gradually added to 3 l. of ether with mild cooling. The ether solution is decanted from the amorphous residue, washing with 500, 250, and 250 ml. portions of ether. After being treated with 10 ml. of 10% NaOH and four 10 ml. portions of 50% NaOH with trituration followed by cooling in an ice bath, the residue crystallizes. The mixture is diluted with 80 ml. of water, and the tan crystalline solid is collected, washing with four 10 ml. portions of water. The crude material is further triturated with 40 ml. of cold water, collected, and washed with a total of 50 ml. of water. Dried in air overnight, the material, 30.2 g., is treated with 500 ml. of isopropanol, and dry HCl is passed through the mixture, cooling in an ice bath. The resultant solution is treated with 250 ml. of ether, and a light tan crystalline solid deposits. Upon cooling, the solid is collected, dissolved in 180 ml. of ethanol, and recrystallized, M.P. 242–244° C. Yield of 4-isopropylamino-6,7-dimethoxyquinoline hydrochloride is 20.7 g. (16%).

*Anal.*—Calc. for $C_{14}H_{18}N_2O_2 \cdot HCl$: C, 59.46; H, 6.77; N, 9.91. Found: C, 59.44; H, 6.68; N, 9.80.

EXAMPLE X

*4-anilino-6,7-dimethoxyquinoline hydrochloride*

4-chloro-6,7-dimethoxyquinoline, 44.0 g. (0.20 mole) is added to a solution of 4.0 ml. (0.05 mole) of conc. HCl in 800 ml. of water. To the mixture is added 11.4 ml. (0.13 mole) of aniline, with stirring. The mixture is heated on the stream bath with intermittent stirring for 3½ hours. The reaction solution is decanted from a small amount of insoluble material and cooled in an ice bath. The resultant tan crystalline solid is collected and washed with five 15 ml. portions of water. Dried in air overnight, the crude product, 65 g., is dissolved in 625 ml. of ethanol, charcoaled, and filtered. Upon cooling in an ice bath, the resultant cream-colored product is collected and washed with five 10 ml. portions of isopropanol and with ether. Yield of 4-anilino-6,7-dimethoxyquinoline hydrochloride is 25.8 g. (41%) M.P. 247–250° C.

*Anal.*—Calc. for $C_{17}H_{16}N_2O_2 \cdot HCl$: C, 64.45; H, 5.41; N, 8.84. Found: C, 64.75; H, 5.16; N, 9.03.

EXAMPLE XI

*4-(3-hydroxypropylamino)-6,7-dimethoxyquinoline*

In a 500 ml. 3-neck flask equipped with stirrer, thermometer and reflux condenser is placed 33 g. (0.15 mole) of 4-chloro-6,7-dimethoxyquinoline, 120 ml. of molten phenol and 12 g. (0.16 mole) of 3-aminopropanol (slight exothermicity). The mixture is heated to reflux by means of a heating mantle and refluxed for two hours.

After being allowed to cool, the dark solution is poured, with efficient stirring, into 1500 ml. of ether. The solid is immediately recrystallized from 500 ml. of methanol using charcoal. This gives 28 g. (62% yield) of crude solid. Standing overnight gives a second crop of 6.5 g. (total crude yield 34.5 g., 77%). This may be recrystallized from methanol to give 4-(3-hydroxypropylamino)-6,7-dimethoxyquinoline, M.P. 235–236° C.

*Anal.*—Calc. for $C_{14}H_{18}N_2O_3 \cdot HCl$: C, 56.28; H, 9.38; Cl, 11.87. Found: C, 56.23; H, 9.30; Cl 11.92.

EXAMPLE XII

*4-(2-aminoethylamino)-6,7-dimethoxyquinoline dihydrochloride*

In a 500 ml. flask, equipped with stirrer, reflux condenser and thermometer, was placed 33 g. (0.15 mole) of 4-chloro-6,7-dimethoxyquinoline, 100 ml. of molten phenol and 9.0 g. (0.15 mole) of ethylenediamine. The solution is heated by means of a heating mantle. The reaction temperature reaches a maximum of 164° C. in about 1¾ hours and is maintained at this temperature for an additional 15 minutes. The mixture is allowed to cool to room temperature and is then poured, with efficient stirring, into 2000 ml. of ether. The tan solid is filtered and washed with ether. The hygroscopic solid is treated with 1500 ml. of boiling methanol and some insoluble material is filtered off. Concentration of the methanol filtrate gives 11 g. (25% yield) of the crude product, M.P. 246–260° C. (dec.). This may be recrystallized from methanol (30 ml./g.) yielding pure compound in the form of its dihydrate, M.P. 245–246° C.

*Anal.*—Calc. for $C_{13}H_{17}N_3O_2 \cdot 2HCl \cdot 2H_2O$: C, 43.83; H, 6.51; N, 11.80; Cl, 19.90. Found: C, 43.76; H, 6.29; N, 11.42; Cl, 19.97.

EXAMPLE XIII

*6,7-dimethoxy-4-morpholinoquinoline hydrochloride*

In a 500 ml. 3-neck flask, equipped with stirrer, reflux condenser and thermometer, is placed 33 g. (0.15 mole) of 4-chloro-6,7-dimethoxyquinoline, 110 ml. of molten phenol and 15 g. (0.17 mole) of morpholine. The solution is heated to reflux and refluxed for 2 hrs. (150–164° C.). After being allowed to cool, the reaction mixture is poured into two liters of ether with stirring. The light tan precipitate is filtered and washed with ether. Since the crude material is somewhat hygroscopic, it is recrystallized from 2500 ml. of isopropanol using charcoal. This gives 29 g. (74% yield), M.P. 204–215° C. Recrystallization of this material from 300 ml. of ethanol containing several drops of conc. HCl gives 23 g. of 6,7-dimethoxy-4-morpholinoquinoline hydrochloride in the form of its monohydrate, M.P. 211–213° C.

*Anal.*—Calc. for $C_{15}H_{18}N_2O_3 \cdot HCl \cdot H_2O$: C, 54.79; H, 6.44; Cl, 10.78. Found: C, 54.67; H, 6.44; Cl, 10.61.

EXAMPLE XIV

*6,7-dimethoxy-4-(3-methoxypropylamino)quinoline hydrochloride*

In a 500 ml. 3-neck flask, fitted with reflux condenser, stirrer and thermometer, is placed 33 g. (0.15 mole) of 4-chloro-6,7-dimethoxyquinoline, 120 ml. of molten phenol and 14 g. (0.16 mole) of 3-methoxypropylamine. The reaction mixture is heated to reflux and refluxing is continued for 2 hours. After being allowed to cool, the reaction product is poured into 2 liters of well stirred ether. An oil separates which soon crystallizes with continued stirring. The precipitate is filtered and washed with ether giving 51 g. of crude material.

The crude material is recrystallized from 750 ml. of ethanol using charcoal. A first crop of 29 g. (62% yield) is isolated. Concentration of the filtrate gives an additional 5 g., total 34 g. (72% yield). A second recrystallization from 500 ml. of absolute ethanol yields 27 g. of 6,7 - dimethoxy-4-(3-methoxypropylamino)quinoline hydrochloride, M.P. 225–228° C.

Anal.—Calc. for $C_{15}H_{20}N_2O_3 \cdot HCl$: C, 57.60; H, 6.77; N, 8.96; Cl, 11.34. Found: C, 57.69; H, 6.76; N, 8.82; Cl, 11.19.

EXAMPLE XV

*4-amino-6,7-diethoxyquinoline hydrochloride*

In a 500 ml. 3-neck flask was placed 57 g. (0.23 mole) of 4-chloro-6,7-diethoxyquinoline and 191 ml. of molten phenol. The flask is fitted with a stirrer, reflux condenser, thermometer and a wide inlet tube through which dry ammonia gas may be passed. The temperature at the beginning of the ammonia addition is 66° C. There is a slight exothermic reaction as the ammonia is bubbled into the phenol solution. The reaction flask is then heated to 100° C. At this temperature, the heat source is removed and ammonia is added until the phenol solution is saturated. This is detected by attaching a Drierite-filled drying tube to the top of the condenser and noting change in color.

When the solution is saturated, the ammonia supply is turned off and the reaction mixture is gradually heated to reflux (184° C.). Ammonia is then continually passed in while the temperature is maintained at this point for four hours.

After being cooled below 30° C., the dark reaction mixture is poured into 2 liters of well-stirred ether. The white solid is filtered and washed with ether to yield 52 g. (84% yield) of crude product. This material is recrystallized from 2750 ml. of ethanol to give 23 g., M.P. 273–274° C. A second crop of 5 g. with the same melting point is obtained by concentration of the filtrate giving a total recovery of 28 g. (54%) of 4-amino-6,7-diethoxyquinoline hydrochloride.

Anal.—Calc. for $C_{13}H_{16}N_2O_2 \cdot HCl$: C, 58.10; H, 6.38; N, 10.43; Cl, 13.19. Found: C, 57.97; H, 6.51; N, 10.36; Cl, 12.95.

EXAMPLE XVI

*4-cyclohexylamino-6,7-dimethoxyquinoline hydrochloride*

In a 500 ml. 3-neck flask, fitted with stirrer, reflux condenser and thermometer, is placed a 33 g. (0.15 mole) of 4-chloro-6,7-dimethoxyquinoline, 120 ml. of molten phenol and 15 g. (0.15 mole) of cyclohexylamine. The reaction mixture is heated to reflux temperature and refluxed for two hours. After being allowed to cool, the dark solution is poured, with stirring, into 1500 ml. of ether. The oil that first forms gradually solidifies. The solid is filtered and washed with ether yielding 24 g. (68%) of crude material. The crude material (24 g.) is converted to the free base with 50% aqueous NaOH. The free base is recrystallized from isopropanol. The purified free base is dissolved in methanol and conc. HCl is added to pH 2–3. The hydrochloride is precipitated by the addition of anhydrous ether yielding 13.74 g. (47% recovery), M.P. 241–242° C., of 4-cyclohexylamino-6,7-dimethoxyquinoline hydrochloride in the form of its hemihydrate.

Anal.—Calc. for $C_{17}H_{22}N_2O_2 \cdot HCl \cdot \frac{1}{2}H_2O$: C, 61.53; H, 7.29; N, 8.44; Cl, 10.68. Found: C, 61.60; H, 7.18; N, 8.34; Cl, 10.77.

EXAMPLE XVII

*6,7-dimethoxy-4-pentylaminoquinoline hydrochloride*

In a 500 ml. 3-neck flask equipped with stirrer, thermometer and reflux condenser is placed 33 g. (0.15 mole) of 4-chloro-6,7-dimethoxyquinoline, 120 ml. of molten phenol and 14 g. (0.16 mole) of n-pentylamine. The solution is heated to reflux (170° C.) and refluxed for two hours.

After being allowed to cool, the dark solution is poured into 1500 ml. of ether with good stirring. The material first forms an oil but, upon trituration, the oil crystallizes. The light tan solid is filtered. It is recrystallized from acetonitrile using charcoal. In this way there are obtained 22 g. (47% yield) of light tan solid. Recrystallization of 17 g. of this from 1 liter of acetonitrile gives 14.5 g. of 6,7-dimethoxy-4-pentylaminoquinoline hydrochloride in the form of its hemihydrate, M.P. 198–200° C.

Analysis.—Calc. for $C_{16}H_{22}N_2O_2 \cdot HCl \cdot \frac{1}{2}H_2O$: C, 60.08; H, 7.56; N, 8.76. Found: C, 60.33; H, 7.42; N, 8.80.

EXAMPLE XVIII

*4-acetamido-6,7-dimethoxyquinoline hydrochloride*

4-amino-6,7-dimethoxyquinoline, 3.0 g. (0.015) mole), is dissolved in 70 ml. of hot acetic anhydride, and the solution is refluxed for 7 hrs. After standing at room temperature for 4 days, a small amount of insoluble material is removed by filtration. The filtrate is stripped to dryness and the semi-crystalline residue is dissolved in 18 ml. of isopropyl alcohol. By treatment with 40 ml. of ether, an additional small amount of solid is removed. The resultant filtrate is treated with dry HCl, cooling in an ice bath. A cream-colored crystalline solid is collected, washing with ether, M.P. 226–235° C. (Yield: 2.4 g.) The crude material is dissolved in 2:1, isopropyl alcohol: ethanol, charcoaled, and reprecipitated with ether. Recrystallized from ca. 60 ml. of ethanol, the 4-acetamido-6,7-dimethoxyquinoline hydrochloride in the form of its monohydrate melts at 254–259° C.

Analysis.—Calc. for $C_{13}H_{14}N_2O_3 \cdot HCl \cdot H_2O$: C, 51.91; H, 5.70; N, 9.31. Found: C, 51.91; H, 5.90; N, 9.00.

EXAMPLE XIX

*Ethyl 6,7-dimethoxy-4-quinolineglycinate hydrochloride*

To a warm solution of 31.5 g. (0.14 mole) of 4-chloro-6,7-dimethoxyquinoline in 260 ml. of phenol, is added 15.4 g. (0.11 mole) of ethyl glycinate hydrochloride. The reaction solution is heated on the steam bath for 3½ hours. The cooled solution is added to 1700 ml. of anhydrous ether, with stirring, yielding a gray crystalline solid which is collected, washed with ether, and recrystallized from 800 ml. of isopropyl alcohol to give 13 g. (27%) of ethyl 6,7-dimethoxy-4-quinolineglycinate hydrochloride in the form of its hemihydrate (M.P. 224–226° C.).

Analysis.—Calc. for $C_{15}H_{18}N_2O_4 \cdot HCl \cdot \frac{1}{2}H_2O$: C, 53.65; H, 6.00; N, 8.34. Found: C, 53.52; H, 5.86; N, 8.28.

EXAMPLE XX

*6,7-dimethoxy-4-(2-dimethylaminoethylamino) quinoline dihydrochloride*

To a warm solution of 40 g. (0.18 mole) of 4-chloro-6,7-dimethoxyquinoline in 300 ml. of phenol, is added gradually 45 ml. of β-dimethylaminoethylamine at 74–83° C. in 5 min., with stirring. The temperature is raised from 83 to 104° C. in ½ hr., and the reaction solution is further heated at 105–114° C. for 7 hrs. After standing overnight, the solution is gradually added to 2600 ml. of anhydrous ether, with cooling. The ether solution is decanted, and the residue is washed with a total of 400 ml. of ether. The residue is dissolved in 400 ml. of isopropyl alcohol, and the solution is treated with dry HCl to a pH of ca. 3. Then the resultant tan crystalline solid is collected, and washed well with cold isopropyl alcohol. Recrystallized from 750 ml. of isopropyl alcohol, the 6,7-dimethoxy-4-(2 - dimethylaminoethylamino) quinoline dihydrochloride in the form of its hydrate melts at 261–265° C. (dec.). Yield: 11 g. (21%).

*Analysis.*—Calc. for $C_{15}H_{21}N_3O_2 \cdot 2HCl \cdot H_2O$: C, 49.18; H, 6.88; N, 11.47. Found: C, 48.90; H, 6.84; N, 11.32.

What is claimed is:

1. A member of the group consisting of a base of the formula:

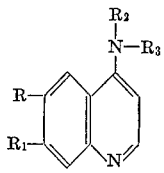

wherein

R and $R_1$ each represent a member of the group consisting of methoxy and ethoxy;

$R_2$ represents a member of the group consisting of hydrogen and methyl;

$R_3$ represents a member of the group consisting of hydrogen, amino, lower alkyl, hydroxy(lower)alkyl, lower alkoxy lower alkyl, carbethoxymethyl, amino(lower)alkyl, di(lower)alkylamino(lower)alkyl, acetyl, cyclohexyl, benzyl and phenyl; and $R_2$ and $R_3$ taken together represent the atoms necessary to complete a ring system chosen from the group consisting of morpholinyl and N-methylpiperazinyl, and the physiologically acceptable mineral acid addition salts thereof.

2. 4-amino-6,7-dimethoxyquinoline hydrochloride.
3. 4-amino-6,7-diethoxyquinoline hydrochloride.
4. 4-isopropylamino - 6,7 - dimethoxyquinoline hydrochloride.
5. 4 - dimethylamino - 6,7 - dimethoxyquinoline hydrochloride.
6. 4-(3-hydroxypropylamino)-6,7 - dimethoxyquinoline.

References Cited by the Examiner

UNITED STATES PATENTS

| | | | |
|---|---|---|---|
| 2,555,943 | 6/1951 | Surrey | 260—288 |
| 2,940,974 | 6/1960 | Surrey | 260—288 |
| 2,940,976 | 6/1960 | Surrey | 260—288 |
| 3,002,001 | 9/1961 | Surrey | 260—288 |

OTHER REFERENCES

Ser. No. 251,396, Tchitchibabine (A.P.C.), published June 1943.

Steck, Chem. Abstracts, vol. 43, col. 1655 (1949).

Irvin et al., J. Am. Chem. Soc., vol. 69, pp. 1091–9 (1947).

ALEX MAZEL, *Primary Examiner.*

WALTER A. MODANCE, *Examiner.*

D. M. KERR, DONALD G. DAUS, *Assistant Examiners.*